April 18, 1961  C. B. MOORE  2,980,855
COULOMETER
Filed Jan. 29, 1959  4 Sheets-Sheet 1
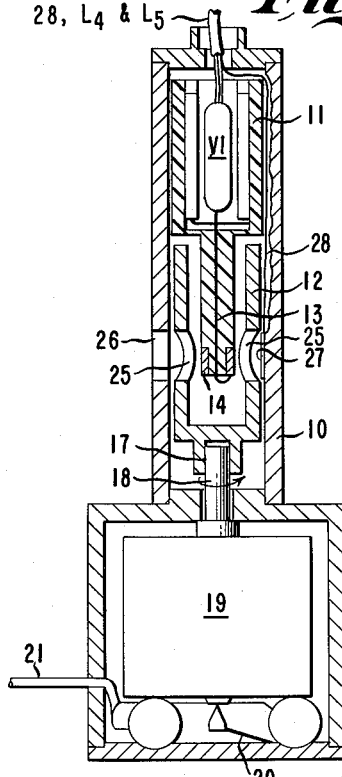
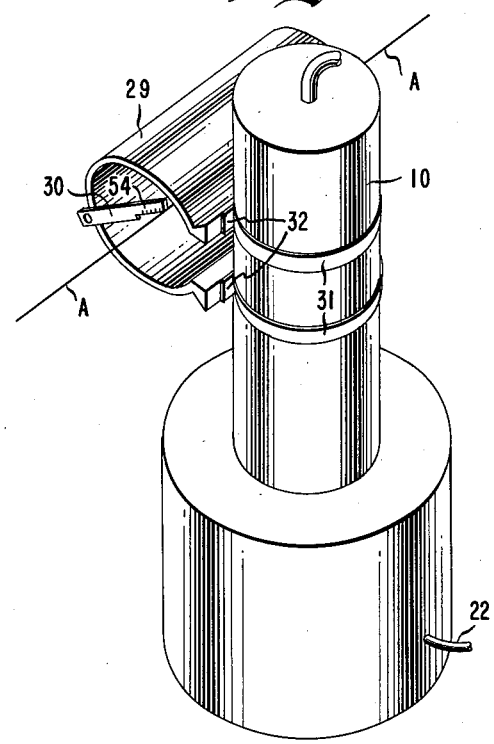
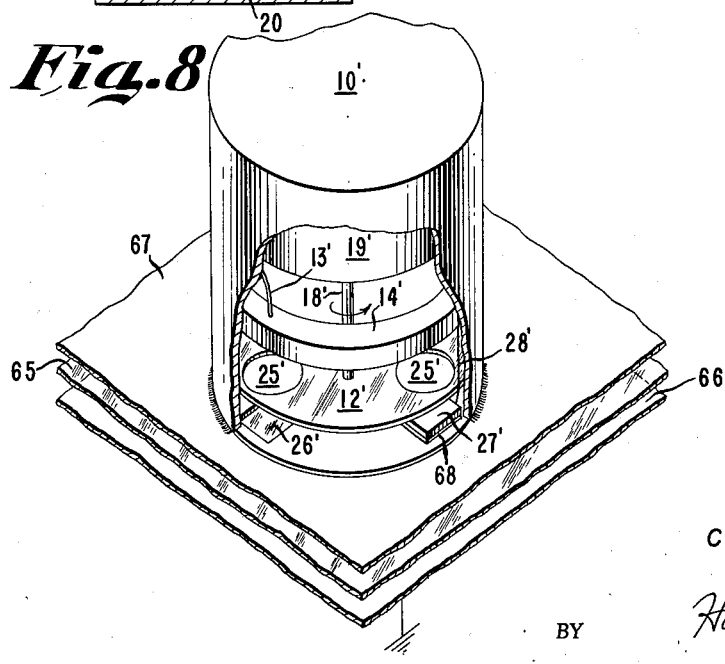
INVENTOR
CHARLES B. MOORE
BY *Harry J. McCauley*
ATTORNEY April 18, 1961 C. B. MOORE 2,980,855
COULOMETER
Filed Jan. 29, 1959 4 Sheets-Sheet 3

UNKNOWN FIELD POSITIVE WITH RESPECT TO GROUND

UNKNOWN FIELD NEGATIVE WITH RESPECT TO GROUND

INVENTOR
CHARLES B. MOORE
BY Harry J. McCauley
ATTORNEY

April 18, 1961    C. B. MOORE    2,980,855
COULOMETER

Filed Jan. 29, 1959    4 Sheets-Sheet 4

INVENTOR
CHARLES B. MOORE

BY    Harry J. McCauley
ATTORNEY

United States Patent Office 2,980,855
Patented Apr. 18, 1961

2,980,855
COULOMETER

Charles B. Moore, Ward, Pa., assignor to E. I. du Pont de Nemours and Company, Wilmington, Del., a corporation of Delaware Filed Jan. 29, 1959, Ser. No. 789,991

4 Claims. (Cl. 324—72)

This invention relates to a coulometer, and particularly to a coulometer adapted to the measurement of electrostatic charges or D.-C. potentials.

The measurement of electrostatic charge in non-conductors, such as during the manufacture of synthetic textile yarn or polymeric films and the like, is important to the conduct of some of the operations. Also, in certain instances it is desirable to measure the D.-C. potentials existing on electrical conductors without contacting the conductors, and the apparatus of this invention is equally useful for this purpose.

Figure 3:
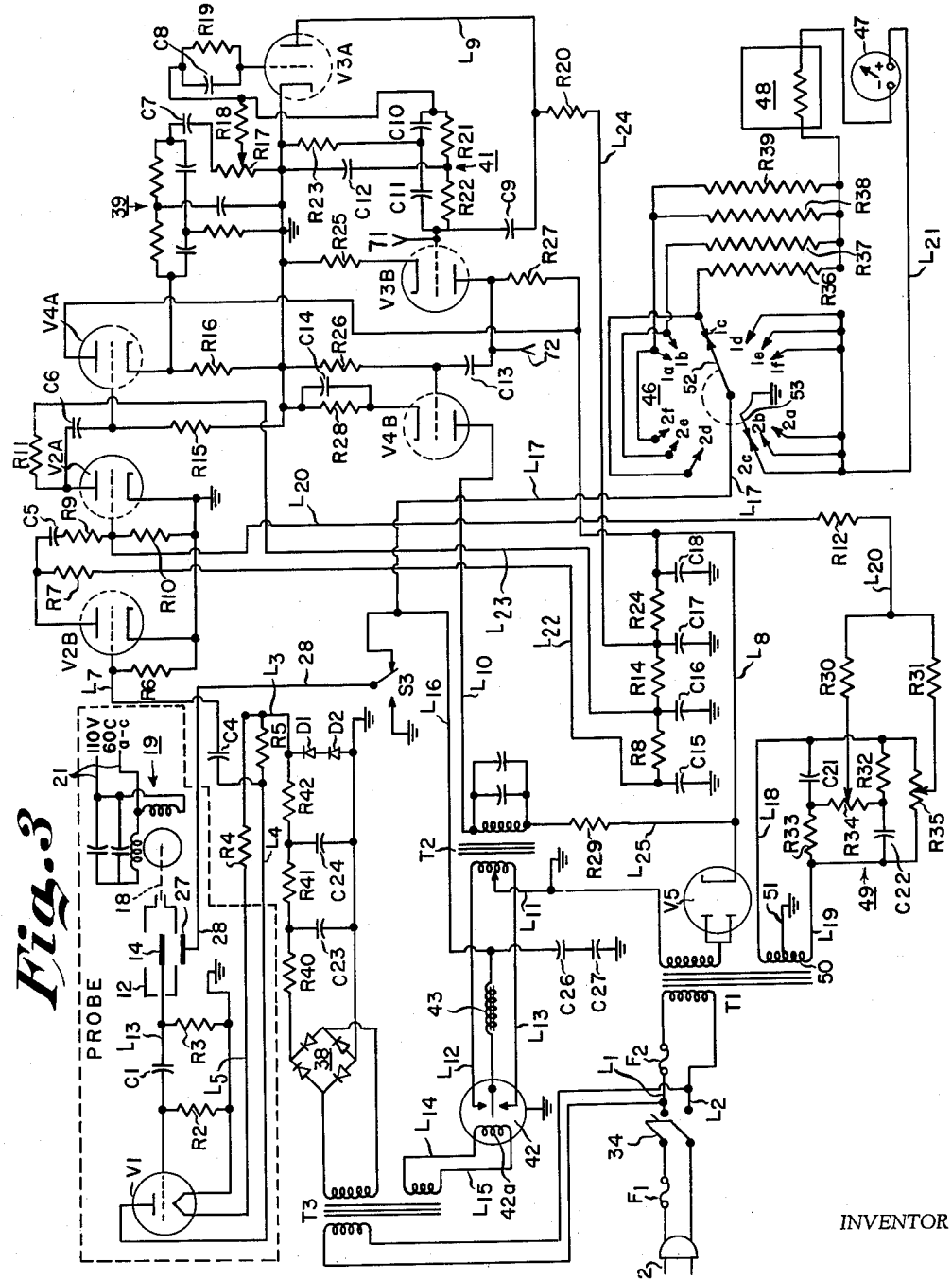
Figure 4A:
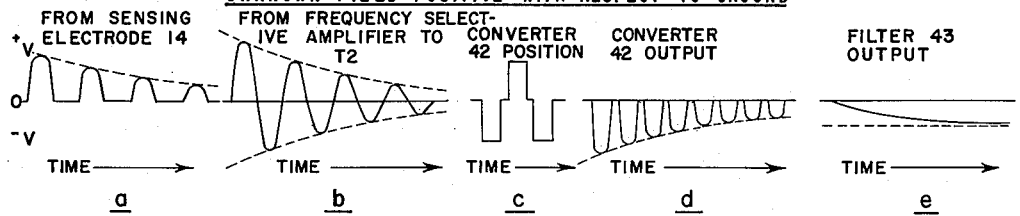
Figure 4B:
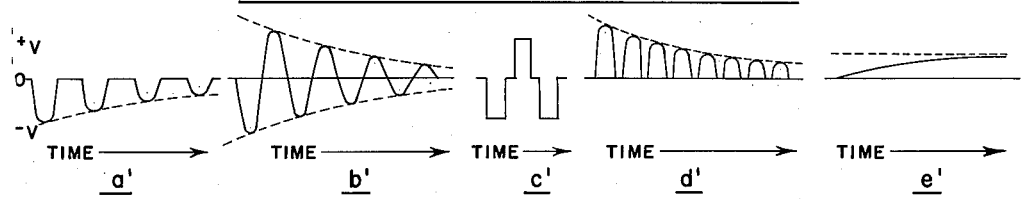
Figure 7:
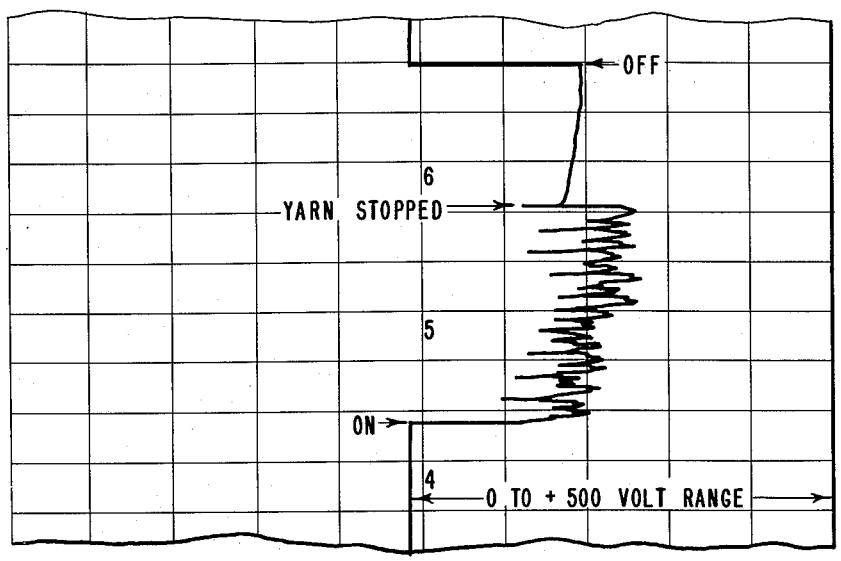
Figure 6:
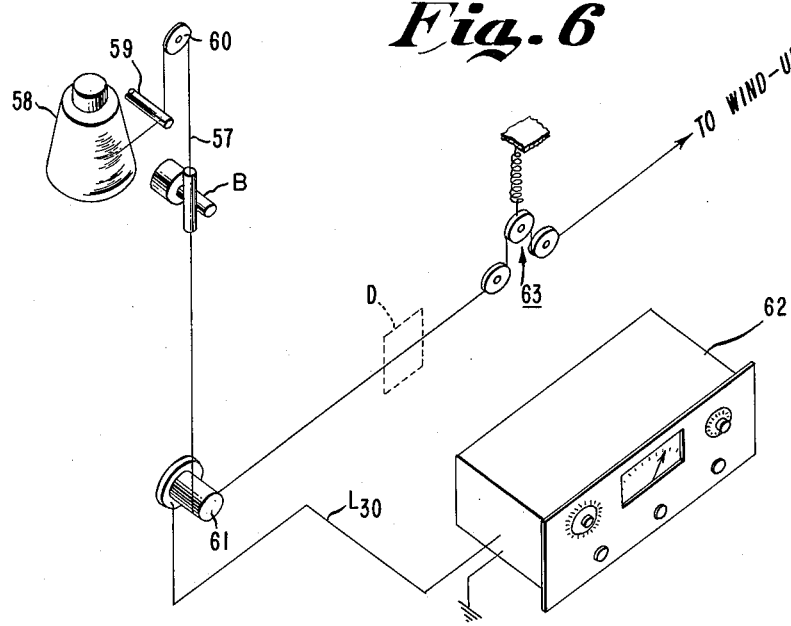
Figure 5:
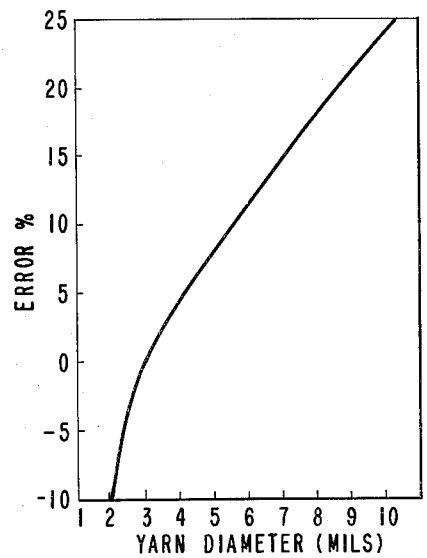

A primary object of this invention is to provide an apparatus adapted to the measurement of electrostatic charges or D.-C. potentials without contact with the object under evaluation. Another object of this invention is to provide a coulometer which has greatly enhanced accuracy and sensitivity over apparatus now available in the art. Other objects of this invention include the provision of a coulometer which can be used to measure charge on a running yarn, is of rugged design and, therefore, suited to use in plant operations, small in size and portable so as to be useful in close spaces, and economical in first cost and maintenance. The manner in which these and other objects of this invention are attained will become apparent from the following detailed description and the drawings, in which:

Fig. 1 is a longitudinal sectional view of a preferred design of probe according to this invention especially adapted to measurements on strand-like materials, Fig. 2 is a perspective view of a probe according to Fig. 1, provided with a suitable electrostatic shield, shown in measuring position with respect to a textile yarn the electrostatic charge of which it is desired to measure, Fig. 3 is a diagrammatic representation of a preferred electrical circuit for use in conjunction with the apparatus of Figs. 1 and 2, Figs 4a and 4b are schematic representations of the electrical potential waveforms with respect to time as abscissa obtained at selected points throughout the circuit of Fig. 3 for the conditions where the reference electrode is initially at ground potential and the unknown field is positive, for Fig. 4a, and negative, for Fig. 4b, Fig. 5 is a graphical representation of the relationship of apparatus readings to yarn diameter for a series of tests conducted on yarns ranging in diameter from 2 to 10 mils, Fig. 6 is a partially schematic representation of a preferred form of calibration apparatus for use with this invention, Fig. 7 is a typical trace of a recorder obtained over a time interval of about two minutes in the evaluation of a yarn traveling at a velocity of 300 yds./minute, and Fig. 8 is a view, partially in section, of a preferred design of probe head particularly adapted to measurements of electrostatic charge on polymeric films.

Generally, the coulometer according to this invention comprises, in combination, a probe provided with a sensing electrode and a reference electrode in close proximity one to another, a chopper interposed between the sensing and reference electrodes provided with windows one of a pair of which cyclically exposes the sensing electrode to view of the reference electrode and the other of which simultaneously exposes the sensing electrode solely to the object under evaluation, an electrometer pickup in electrical circuit with the sensing electrode, and means operated in common phase relationship with the chopper responsive to the electrometer pickup adapted to generate a D.-C. voltage which is a function of the A.-C. output from the electrometer pickup, and to apply the D.-C. voltage as a feedback to the reference electrode and to a voltmeter measuring the electrical quantity under evaluation.

Referring to Figs. 1, 2 and 3 a preferred design of probe for an embodiment of apparatus adapted to perform measurements on strand-like objects consists of all elements mounted within cylindrical, electrostatically shielded housing 10, which may be of stainless steel or other electrically conductive material. The upper part of the housing is reserved for electrometer tube V1, which has a high input impedance of about $10^{12}$ ohms and may conveniently be a Victoreen VX–55, plus its associated circuit components hereinafter described. This assembly is enclosed within an insulated sub-housing 11, which may be fabricated from polytetrafluoroethylene or the like.

The intermediate region of housing 10 contains rotary chopper 12, which, in this instance, consists of an elongated annular aluminum cup disposed with open end adjacent electrometer tube V1 to receive within it, and coaxial therewith, the depending end of sub-housing 11, within which is disposed electrical lead 13 running from the grid of V1 to annular sensing electrode 14, which may conveniently be an aluminum ring.

The base of chopper 12 is provided with axially disposed blind bore 17 receiving the outboard end of drive shaft 18 of motor 19, the chopper being secured to the drive shaft with a set screw not shown. Motor 19 is a 1/2000 H.P., 1800 r.p.m., 4 pole orienting hysteresis type synchronous motor, such as a Borg Model 1001–4SY shown in conventional electrical representation in Fig. 3. It is essential that an electrical ground be provided for removal of any signal which is generated in the course of chopper rotation and this is afforded by point contact conductor 20 in firm abutment with the inboard end of drive shaft 18 and also with housing 10, which is grounded by conventional means not shown. The power supply cable for motor 19 is indicated at 21, which runs to a common 110 v., 60 cycle power supply 22 (Fig. 3) used also for the other power connections of the apparatus hereinafter described.

In the detailed design of probe shown in Fig. 1, chopper 12 is provided with two diametrically opposed windows 25 on a level with a port 26, which views the strand-like object or film in evaluation, and with reference electrode 27, which preferably consists of a rectangular coupon of aluminum. Electrode 27 is attached to the inside of housing 10 between chopper 12, but clear of it, and the housing, and is electrically insulated from the housing but has its bare metal face oriented toward sensing electrode 14. Insulated lead 28 running to reference electrode 27 constitutes the feedback connection hereinafter described.

It is particularly desirable to obtain a close approach to a sinusoidal output signal from sensing electrode 14, and this can be accomplished by shaping the several components of the apparatus so that predetermined relative areas are cyclically brought into registration in the course of chopper rotation. Thus, it is preferred that port 26 in housing 10 and reference electrode 27 each be generally rectangular in configuration, the word "rectangular" being employed in a sense comprehensive of square, and congruent in boundary shape to one another when projected on the same plane of reference. Also, windows 25 in chopper 12 should be generally circular in configuration and of diameter measured in the general plane including port 26 equal to the corresponding dimensions of port 26 and reference electrode 27. In a typical apparatus constructed according to this invention sensing electrode 14 was a ring of 0.25" outside diameter of ½" axial length, while port 26 and reference electrode 27 were generally square, 0.5" on a side, and windows 25 were generally circular, of 0.5" diameter. The several components were arranged concentrically on radii of 7/16" to the outside of chopper 12, and 0.50" to the inside surface of housing 10, which typically has a wall thickness of about ⅛". It will be understood that, while a rotatable chopper is preferred, because of simplicity of drive in strict constant time phase, it is feasible to employ a reciprocatory chopper and, of course, housing 10 and chopper 12 may then be plane-surfaced members to suit design convenience where necessary.

Referring to Fig. 2, the probe is preferably provided with a light metal open-ended shield 29 which safeguards against electrostatic charge or potential effects extraneous of the object under evaluation. A cylindrical shield of 3" diameter, 5" long has proved completely satisfactory in measurements of electrostatic charge existing on a running yarn strand indicated at A, Fig. 2. Calibrated yarn guides 30 are pivotally mounted at opposite ends of shield 29 so as to permit convenient accurate positioning of the probe with respect to the yarn, as is hereinafter described, and housing 10 is provided with fixed bands 31 which are fitted with ways 32 for the secure spring attachment of shield 29 to the housing.

Turning now to Fig. 3 particularly, the common power supply for motor 19 and for the transformers $T_1$ and $T_2$ is derived from the same source, conveniently the usual 110 v., 60 c. lighting current mains 22 provided with fuses $F_1$ and $F_2$, respectively, in advance of and past double pole, single throw switch 34, the leads 21 to motor 19 being omitted for simplicity in representation. The primary windings of transformers $T_1$ and $T_3$ are connected directly to leads $L_1$ and $L_2$, and each transformer is provided with two secondary windings. The first secondary winding of $T_3$ energizes full-wave bridge rectifier 38, to the output of which is connected the filter network consisting of resistors R40 and R41 (typically 270 ohms and 3000 ohms, respectively) and electrolytic capacitors C23 and C24 (typically 8 and 12 microfarads, respectively). This network removes pulsations from the full-wave rectifier voltage and delivers an output averaged to a substantially constant D.-C. voltage which passes to current-limiting resistor R42 (e.g., 3000 ohms) and thence to the Zener silicon or germanium diodes D1 and D2, which may typically be Raytheon model 1N438. These diodes maintain constant current through $L_3$ to the filamentary cathode of V1 by maintaining constant voltage referred to ground at the input terminal of $L_3$. $L_4$ in circuit with resistor R5 (typically 330K ohms), and $L_5$ in circuit with resistor R4 (typically 1800 ohms) connect respectively with the plate and cathode of electrometer tube V1.

The sinusoidal alternating voltage signal from sensing electrode 14 passes to the grid of V1 via $L_{13}$ in circuit with a coupling capacitor C1 (e.g., 0.001µf.) and resistors $R_3$ ($10^{10}$ ohms) and R2 ($10^{11}$ ohms) shunting to ground. R3 effectively clamps sensing electrode 14 at ground potential, whereas R2 is a grid return. The A.-C. output signal from electrometer tube V1 is derived from the plate through $L_4$, thence through coupling capacitor C4 (0.015 µf.) and $L_7$ to the grid of V2B. Vacuum tubes V2, V3 and V4 are each double triode tubes, the respective half-sections of which are denoted by the suffixes "A" and "B" in accordance with conventional practice, with the half-sectional nature indicated by broken line representation of half of the enclosing envelopes. V2 and V4 can conveniently be of the 12AT7 type, whereas V3 can be a 12AX7. The circuit comprising these vacuum tubes is more or less conventional and can be conveniently assembled on a Brown 40X amplifier chassis as base by retaining tubes V2 and V3 as received and substituting for the rest of the circuit therein tube V4, section V4A of which functions as a cathode follower while V4B serves as a second power amplification stage.

The B+ voltage supply for the tube circuit V2—V4 is derived through $L_8$ in a manner hereinafter described connected to the plate resistors of V2A and V2B through R24 and R14 (typically each 56K ohms) in series for V2A, and these resistors with the added series resistor R8 (typically 150K ohms) for V2B. Resistors R7 and R11 immediately preceding the plates have the values 470K ohms and 1 megohm, respectively. The grid of V2B is provided with a ground return resistor R6 (typically 10 megohms) whereas the cathode is connected directly to ground. The cathode of V2A is connected directly to ground, and C5 (0.015 µf.) couples voltage amplification stage V2B to the grid of V2A. Resistor R9 (typically 100K ohms) is an isolating resistor and R10 (10 megohms) is a ground return resistor. Capacitors C15 and C16 (each 10 µf.), shunted from the plate supply to ground, clear the circuit of any A.C. components which may appear here.

The amplifier gain of V2B—V2A is of the order of 400 to 500 and the output is coupled to the grid of cathode follower V4A through C6 (0.47 µf.) provided with a ground return R15 (1 megohm). The plate of V4A is connected to B+ supply through $L_8$ running to the cathode of V5, and the cathode resistor R16 is typically 1000 ohms. The function of V4A is to supply the signal at a low impedance level to the twin T 120 cycle rejection filter designated generally at 39, which may conveniently be a White Instrument Laboratories Model 542–120, or any commercial equivalent. Filter 39 passes the 60 cycle error signal of interest while rejecting 120 cycle noise concomitantly generated by the rotation of chopper 12 as well as other noise of 120 cycle frequency generated in low power level components of the circuit comprising V1, V2B and V2A. The filtered output from 39 is coupled through capacitor C7 (0.05 µf.), to the grid of V3A, preceding which is voltage divider R17 (1 megohm range), which constitutes the amplifier gain adjustment. The tap is provided with R18 (470K ohms), constituting an isolation resistor, which prevents loading of filter 41 hereinafter described. This is followed in circuit by the R-C network consisting of R19 (10 megohms) and C8 (0.015 µf.) which together function as a grid leak bias.

The cathode of V3A is connected directly to ground, while the plate is connected to B+ supply through plate load resistor R20 (typically 1 megohm) in $L_8$ and is also coupled through C9 (0.22 µf.) to the grid of V3B in shunt relationship to a second twin T filter indicated generally at 41. The latter is similar in circuit configuration to 39, except that the following component values have been selected for a typical apparatus: R21 and R22, each 1.061 megohms; R23, 0.531 megohm; C10 and C11, each 0.0025 µf.; and C12, 0.005 µf. The function of the combination consisting of V3A and filter 41 is to pass selectively the 60 cycle error signal which has cleared filter 39 while substantially excluding all other frequencies not previously removed. V3B and V4B together constitute a two-stage power amplifier provided with cathode resistors R25 (1000 ohms) and R28 (10K ohms), respectively, and coupling capacitor C13 (0.047 µf.). The grid return R26 of V4B is typically 470K ohms and the cathode of V4B is grounded to A.-C. through C14, typically 20 µf. The plate load resistor of V3B, R27 (typically 1 megohm), is connected to B+ supply via $L_8$ running to the cathode of V5 hereinafter described. The finally filtered and amplified 60 cycle error signal is then passed through $L_{10}$ to the primary winding of T2, which may conveniently be a Thordarson Model 20A17 equipped with a center-tapped secondary winding, which in this instance is tied to ground through $L_{11}$, and a pair of parallel-connected capacitors of such value as to obtain resonance at 60 cycles in the network consisting of these capacitors and the primary winding of T2. The two end taps of the secondary of T2 are connected through $L_{12}$ and $L_{13}$ with the opposite contacts of a vibrating reed converter 42, which is commercially available as a Brown Model 75829-1, the function of which is to convert the incoming A.-C. error signal to D.-C. of polarity determined by the time-phase relationship of the A.-C. signal.

The solenoid 42a of converter 42 is powered through $L_{14}$ and $L_{15}$ connected in circuit with the second secondary winding of transformer T3. The D.-C. output from the reed of 42 is filtered by the circuit including iron core inductor 43 (typically 2 henries) and back-to-back connected capacitors C26 and C27 running to ground, which each have values of 100 µf. in the apparatus specifically described. The D.-C. signal is then routed to feedback connection 28 through $L_{16}$ and single pole, double throw toggle switch S3. The signal is simultaneously passed through $L_{17}$ to the range selector, indicated generally at 46, and thence to meter 47 and recorder 48.

V5 is a full-wave rectifier tube, which can be a Sylvania type 6X4, which is powered from the first secondary winding of transformer T1, one end of which is grounded and the other end of which connects with the twin plate elements of V5. The D.-C. output from V5 is withdrawn through $L_8$ and constitutes the B+ supply of 200 volts for the entire apparatus. $L_8$ connects with the low-pass filter network consisting of C15—C18 and R8, R14 and R24, and also through $L_{25}$, R29 (typically 68K ohms), the primary winding of T2 and $L_{10}$. The low-pass filter network is conventional in all respects and has the purpose of providing a suitably filtered B+ supply to the plates of V2B, V2A and V3A through the individual leads $L_{22}$, $L_{23}$ and $L_{24}$, respectively.

It is optionally desirable to provide a hum balance auxilary circuit, indicated generally at 49, which is powered from center-tapped secondary winding 50 of transformer T1 through $L_{18}$ and $L_{19}$. The center-tap connection 51 is grounded. The hum balance circuit includes two R.-C. circuits connected in parallel, but reversed in order of the components, each having a resistor R32 and R33, respectively, of 2700 ohms value, and a capacitor C22 and C21, respectively, of 1 µf. value. The circuit is completed by two identical potentiometers, one connected in parallel with the two R.-C. pairs and the other connected between the resistors and capacitors of both pairs, in which R34 and R35 each have a value of 50K ohms and their isolation resistors R30 and R31, respectively, each have a value of 470K ohms. The remote ends of R30 and R31 both connect to $L_{20}$, and thence to isolation resistor R12 (typically 100K ohms) and the grid of V2A.

The purpose of the hum balance circuit is to provide a reference signal at 60 c.p.s. frequency which is adjustable without discontinuity throughout its full range as regards both amplitude and phase concomitantly. The voltage signal from 49 is injected through $L_{20}$ and R12 on the control grid of V2A at a preselected phase and amplitude adapted to buck out any spurious 60 c.p.s. voltage introduced from stray pickup in the electronic components. Since stray pickup is fairly constant in nature and amount, this bucking voltage need be adjusted only intermittently, as an example, once during every week maximum. When a bucking voltage adjustment is to be made, the apparatus is taken out of service for a brief time and switch S3 moved to its left-hand position, so as to ground reference electrode 27. Then port 26 is covered with a grounded metallic shield to eliminate electric fields inside housing 10. Switch 34 is, of course, retained in closed position and chopper 12 continues rotating as in normal operation.

An oscilloscope is connected first between pin jack 71 and ground and R34 and R35 each adjusted in random sequence until the oscilloscope trace shows no more 60 c. component present. Then the oscilloscope is connected between pin jack 72 and ground and R34 and R35 again adjusted. Following this, the shield over port 26 is removed, S3 is shifted to its right-hand position and the apparatus is thereupon restored to service.

Range selector 46 is of conventional design and embodies two rotatable switch arms 52 and 53 which are ganged for movement together as indicated by the broken line connection in Fig. 3. Switch arm 52 is connected with $L_{17}$ and is adapted to complete the electrical circuit selectively with one of the contacts 1a—1f, whereas switch arm 53 is connected with electrical ground and is adapted to complete the electrical circuit selectively with one of the contacts 2a—2f which are respectively disposed diametrically opposite from the 1-series contacts denoted by the same suffix letters. Contacts 1d—1f and 2a—2c all connect to common lead $L_{21}$ and thence to the positive terminal of indicating meter 47, which can conveniently be a Simpson 0–100 µa. Model 127. Contacts 1a—1c and 2d—2f, respectively, are individually connected to recorder 48 through preselected meter calibration resistors R36, R37, R38, and R39, typically having values of 100K ohms, 50K ohms, 10K ohms, and 60K ohms, respectively, to thereby adjust the signal voltage magnitude so as to come within the range of the measuring scales of the recorder and meter. The circuit connections 1a—1c and 2d—2f of range selector 46 are such that a reverse switching action is provided to permit use of single scales in both recorder 48 and meter 47, regardless of the polarity of the signal voltage. Recorder 48 can be a conventional recording potentiometer of 0–10 mv. D.-C. range, such as a Minneapolis-Honeywell Model 153X, connected in series between range selector 46 and meter 47.

The operation of the preferred embodiment of apparatus hereinbefore described in detail will first be set forth in the measurement of electrostatic charge, after which operation in the measurement of electrical potential will become amply clear.

At the outset it will be understood that sensing electrode 14 is connected to ground through the very high impedance of R3, and will thus tend to take the potential of the field which exists at any given point in the vicinity of an object, such as a charged non-conductive yarn strand or film, or a wire conductor existing in any given potential state referred to ground. The magnitude of the potential taken by electrode 14 is only a very small fraction of the potential of the strand or other object under evaluation, which fraction is actually the ratio of the respective impedances existing between the sensing electrode to ground and the strand or similar object to the sensing electrode. Thus, the potential of sensing electrode 14 is typically of the order of only about 10 microvolts per 100 volts existing on the strand, a difference of about $10^7$; however, the relationship is a linear one, which is highly advantageous from the standpoint of ease in calibration as hereinafter described.

It will be understood that the apparatus probe cannot be brought into contact with the object under evaluation, because this would change the potential condition of the object. Also, the necessity for shielding the probe together with the individual effects of dimensional factors relating to the probe components complicates any calculation of signal output responsive to a given potential condition and necessitates calibration of the apparatus in order to obtain high accuracy of operation. The electrostatic charge concentrations on 1 to 10 mil diameter filaments, or multifilaments, of yarn are only of the order of micromicrocoulombs/cm. length of the yarn and, therefore, sensitivity requirements of instruments according to this invention are ±1 μμcoulomb for this particular diameter range.

The principle employed by the apparatus of this invention is that of field comparison, by which is meant the comparison of the unknown field sensed by electrode 14 with respect to the strand or other object under evaluation with a second known field of opposite polarity completely independent of the first which is set up between reference electrode 27 and the same sensing electrode 14. At balance of the two fields, one must equal the other in magnitude within the limits of error characteristic of the apparatus, which, for force balance systems of this type, consists of a constant percentage error in the measurement in terms of the variable being measured. Typically, this error is about 1% of the measured variable, or 2 volts difference in effective potential of a filament in evaluation, whichever is larger.

Chopper 12 is driven at a synchronous speed of 1800 r.p.m. by motor 19 which, in alternation, simultaneously exposes sensing electrode 14 to the field of the object under evaluation via port 26 and one window 25 and to the field of reference electrode 27 via the other window 25, and then interposes the shielding wall therebetween, which latter effectively drops the potential of electrode 14 to zero. This cyclical chopping occurs at a rate of 3600 times per minute where two windows 25 are provided, as here, and, if there is any potential unbalance between the fields imposed on sensing electrode 14 by the object under evaluation and by reference electrode 27, there will be generated a 60 cycle/sec. error signal which will be picked up by the grid of electrometer tube V1 and passed on to the succeeding electrical circuit.

The wave forms of the error signal during the brief interval of time required to achieve field balance are shown for selected points in the circuit for two typical conditions in Figs. 4a and 4b. For simplicity in representation reference electrode 27 is here considered to be initially at ground potential; however, it will be particularly understood that this need not be the case, and that, for any existing potential level, the filter output voltage depicted in e and e' will simply rise or drop therefrom in a direction such as to oppose the unknown field with a field of opposite polarity but of the same final magnitude.

Fig. 4a depicts wave forms which exist where the unknown field is positive to ground, whereas Fig. 4b depicts the waveforms applicable to the same time base as abscissa but where the unknown field is negative with respect to ground and of the same magnitude as in Fig. 4a. Voltage amplification is disregarded to permit ease of representation.

The error signal outputs from V1 for the two conditions portrayed will be according to the left-hand pulse traces a and a', respectively, and it will be seen that the pulses are bounded by an exponential envelope indicated in broken line representation, so that there is a progressive decrease in amplitude which is continued throughout the subsequent circuitry.

The error signal voltage from V1 is first subjected to voltage amplification in V2B and V2A (Fig. 3) and is then passed to the frequency selective sub-circuit inclusive of V4A, filter 39, which specifically rejects 120 cycle components while passing 60 cycle signal proportionately much less attenuated, and thence to the general screening filter 41 made up of capacitors C10—C12, resistors R21—R23 and V3A. The A.-C. error signal is then subjected to power amplification in V3B and V4B, and the output therefrom is of the full sinusoidal form shown in traces b and b' of Figs. 4a and 4b, these being identical, except out of time phase one with another by 180°. The signal is then applied to the primary winding of transformer T2, i.e., the right-hand winding as seen in Fig. 3, which induces the same waveforms in the center-tapped secondary winding. These are applied to the two contacts of vibrating reed converter 42 through leads L12 and L13 and the vibrating reed thereof caused to make and break the contacts in alternation for fixed periods of time by the synchronous operation of solenoid 42a. The time relationship of the switching action of converter 42 is shown in identical diagrams c and c' drawn in adjacent to the waveforms of both Figs. 4a and 4b, and it will be seen that there is a short, finite time interval between the breaking of one contact of the converter and the making of the other. The operation of T2 in conjunction with converter 42 is such as to obtain a phase sensitivity, i.e., where the field of the strand is positive to reference electrode 27, as in the case of Fig. 4a, the output potential at the converter reed has the negative polarity indicated by the trace d, while the converse is true for d' of Fig. 4b. This output signal is filtered by the single section LC filter made up of inductor 43 and capacitors C26 and C27 to yield D.-C. voltages e and e', of Figs. 4a and 4b, respectively, which quickly take unique average values by asymptotic approach to the potential levels indicated in broken line representation, which constitute the precise values necessary to achieve exact field balance. This output is removed through L16 and applied concurrently to reference electrode 27 through S3 closed on its right-hand contact via feedback connection 28, and to L17 running to switch arm 52 of range selector 46. Switch arm 52 and its ganged associated arm 53 are manually set to the suitable combination of contacts 1a—1f and 2a—2f to interpose the appropriate meter calibration resistance, i.e., R36—R39, in series with recording potentiometer 48 and meter 47, thereby providing both a record and an indication. The potential recorded by 48 and indicated by 47 is, in fact, that assumed by reference electrode 27 with respect to ground, which, taking account of the reversed polarity, is equal in magnitude to the unknown field of the strand under evaluation within the limits of error of the apparatus and the speed of response, which latter is about 1/10 second.

Turning now to the calibration of the apparatus, the general relationship which exists when an object containing an electrical charge of either sign is disposed adjacent a neutral surface is expressed as $V=Q/C$, where V is the potential in volts developed between the object and the neutral surface, Q is the excess electric charge in coulombs and C is the electrical capacity in farads. Simple calculation of the electrical capacity C is in error whenever confronting surfaces other than planar and cylindrical are involved, so that it is preferred instead to calibrate the apparatus under simulated operating conditions.

The most satisfactory calibration entails reference to electrical conductors carrying steady, predetermined potentials of about the same magnitudes as are to be expected in later uses of the apparatus. This type of calibration also illustrates the utility of the invention for the measurement of potentials of conductive media, as contrasted with the measurement of electrostatic charges carried by non-conductors hereinbefore described.

In a typical calibration, wires having diameters approaching to a close tolerance 1, 2, 3, 5, and 10 mils, respectively, were employed and instrument readings in the ranges 0–100, 0–500, and 0–1000 volts obtained for each size. It was found that the determined potentials varied as a function of the wire diameter, and this phenomenon was investigated using the 3 mil diameter wire as standard with a constant distance of separation of 7/16" between the wires and housing 10 during all of the tests. A typical plot of the percentage error as ordinate versus yarn diameter as abscissa is shown in Fig. 5. Here the percentage error at 3 mils is arbitrarily selected as zero and the percent error plotted on the ordinate scale is the quotient of the difference in potential reading obtained at a given potential on the test wire with wire sizes larger or smaller than 3 mils diameter from that for the 3 mil size to the potential reading for the 3 mil diameter wire. It is seen that a very appreciable error exists, which, in this instance, is negative in sign below 3 mils diameter and positive above 3 mils. It is possible to compensate for this effect of strand diameter by disposing the larger diameter strands at predetermined spacings from housing 10 greater than the 7/16" spacing for the 3 mil wire and correspondingly disposing the smaller strands at somewhat closer relative distances. Once these spacings are determined, yarn guides 30 (Fig. 2) can be calibrated as indicated at 54, so that the same apparatus may be employed for the measurement of charge on a plurality of different strand diameters completely free of error introduced by diametral difference. A typical range of strand-to-housing spacings is as follows: 1 mil dia., 0.391"; 2 mil dia., 0.414"; 3 mil dia., 0.438"; 5 mil dia., 0.461"; 7 mil dia., 0.484"; and 10 mil dia., 0.531".

A calibration apparatus appropriate to the determination of the capacity C hereinbefore mentioned which is especially convenient for use in the field is shown in Fig. 6. Here the calibration is effected on a length of yarn filament 57 directly, the supply of which is derived from bobbin 58 by drawing the yarn over guide 59 and directional pulley 60. The yarn is then partially wrapped around metal draw pin 61, which is electrically insulated from ground, and is thence passed through the tensioning device indicated generally at 63, after which the yarn is removed to any conventional winding device not shown. A grounded high sensitivity electronic micromicroammeter 62 is connected to draw pin 61 through insulated lead $L_{30}$. In use, a given length of yarn is drawn from bobbin 58 over draw pin 61 and the ensuing gain or loss in charge by or from the yarn is measured on micromicroammeter 62. The coulometer to be calibrated is first placed at position B to obtain a potential reading on the yarn in advance of contact with draw pin 61, after which the coulometer is shifted to position D a small distance past 61 and a second reading obtained. The difference in the potential readings resulting from the transfer of charge between strand 57 and draw pin 61 permits calculation of the capacity C as the ratio of the difference in charge to the difference in meter readings obtained at the two positions B and D.

Referring to Fig. 7, there is shown a typical electrostatic charge profile as obtained with recorder 48 during a test of 2 minutes duration conducted on a strand made up of 34 monofilament nylon yarn of 3.7 mils overall diameter traveling at a velocity of 300 yds./minute. It will be seen that the charge on the yarn varies relatively widely over a potential range of about 125 volts. Such variation has been found to be characteristic of most polymeric yarns during extensive tests conducted on a wide variety of materials. At the end of two minutes the yarn was halted in its course and it can be seen that the apparatus continued to record the charge on that stationary length of yarn remaining in view of port 26, as indicated by the fairly steady trace immediately preceding the point "OFF" at which the power supply switch 34 was opened.

Fig. 8 is a view of an alternate design of probe head which is particularly preferred for the evaluation of electrostatic charge or potential on films or other planar surfaces, such as represented generally at 65. With this construction the shield against the effects of extraneous fields can be discontinuous in construction, consisting simply of a lower flat metal plate such as 66 connected to electrical ground and disposed out of contact with the film a distance about 2–3" therefrom over the full width thereof, or preferably 2 or 3" beyond the edges, and an upper flat metal plate 67 integral with housing 10'.

As in the embodiment of Fig. 1 the hysteresis synchronous motor 19' is enclosed within housing 10' and is provided with a drive shaft 18' to the end of which is fixedly attached the chopper 12'. The chopper in this case is a flat circular metal plate provided with two diametrically opposed windows 25', which are adapted to sequentially view rectangular port 26' provided in the end of the housing. The sensing electrode 14' is disposed coparallel with chopper 12' and consequently is viewed in an axial direction rather than radially as taught for the apparatus of Fig. 1. Sensing electrode 14' is supported by insulated struts, not shown, secured to the interior of housing 10' and is provided with electrical lead 13' connecting with the grid of an electrometer tube V1 not shown. Rectangular reference electrode 27' is disposed coparallel with chopper 12' and sensing electrode 14' and is insulated by pad 68 from contact with 67, the feedback connection being 28'. All other details of construction are the same as hereinbefore described for the embodiment of Figs. 1–3.

From the foregoing it will be understood that this invention can be modified in numerous respects without departure from its essential spirit, and it is accordingly intended to be limited only by the scope of the appended claims.

What is claimed is:

1. A coulometer for the measurement of electrostatic charges or D.-C. potentials comprising in combinaiton a probe consisting of a sensing electrode and a reference electrode located in close proximity to one another within an electrostatically shielded housing, a port in said housing disposed between said sensing electrode and the outside environment, a cyclically operated electrostatically shielded chopper disposed between said sensing electrode and said port in said housing and also between said sensing electrode and said reference electrode, said chopper being provided with at least one pair of open windows one disposed with respect to the other so that one of the windows of said pair cyclically registers with both said port in said housing and said sensing electrode and the other of the windows of said pair simultaneously cyclically registers with both said sensing electrode and said reference electrode, an electrometer pickup in electrical circuit with said sensing electrode, and means operating in common phase relationship with said chopper responsive to said electrometer pickup adapted to generate a D.-C. voltage which is a function of the A.-C. output from said electrometer pickup and to apply said D.C.-voltage as a feedback to said reference electrode and to a voltmeter measuring the electrical quantity under evaluation.

2. A coulometer for the measurement of electrostatic charges or D.-C. potentials according to claim 1 wherein said port in said housing and said reference electrode are each generally rectangular in configuration and congruent in boundary shape one with the other when projected on the same plane of reference, and said open windows in said chopper are each substantially equal in size, generally circular in configuration and of diameter measured in a plane co-parallel with the general planes including said port in said housing and said reference electrode substantially equal to the corresponding dimensions of said port in said housing and said reference electrode.

3. A coulometer for the measurement of electrostatic charges or D.-C. potentials according to claim 1 wherein said cyclically operated electrostatically shielded chopper consists of a rotatable member provided with powered drive means for the rotation of said member at substantially constant angular velocity.

4. A coulometer for the measurement of electrostatic charges or D.-C. potentials comprising in combination a probe consisting of a centrally disposed annular sensing electrode and, coaxial with and in close proximity to said sensing electrode in sequence radially outward, an annular rotatable electrostatically shielded chopper and an enclosing electrostatically shielded housing, said housing being provided with an open port and said chopper being provided with at least one pair of diametrically opposed open windows disposed coplanar radially with said open port and with said sensing electrode, a reference electrode disposed radially of said sensing electrode coplanar radially with said open port in said housing and with said open windows in said chopper intermediate said chopper and the inner wall of said housing and opposite said open port referred to said longitudinal axis of said sensing electrode, means for the powered rotation of said chopper at substantially constant angular velocity, an electrometer pickup in electrical circuit with said sensing electrode, and means operating in common phase relationship with said chopper responsive to said electrometer pickup adapted to generate a D.-C. voltage which is a function of the A.-C. output from said electrometer pickup and to apply said D.-C. voltage as a feedback to said reference electrode and to a voltmeter measuring the electrical quantity under evaluation.

References Cited in the file of this patent

UNITED STATES PATENTS

| | | |
|---|---|---|
| 2,449,068 | Gunn | Sept. 14, 1948 |
| 2,587,156 | Havenhill et al. | Feb. 26, 1952 |
| 2,659,863 | Stanton | Nov. 17, 1953 |